United States Patent
Bryan et al.

(10) Patent No.: US 6,521,282 B1
(45) Date of Patent: Feb. 18, 2003

(54) AGLUCONE ISOFLAVONE ENRICHED VEGETABLE FLOUR AND GRIT

(75) Inventors: Barbara A. Bryan, University City, MO (US); Maryann C. Allred, Collinsville, IL (US)

(73) Assignee: Protein Technologies International, Inc., St. Louis, MO (US)

( * ) Notice: Subject to any disclaimer, the term of this patent is extended or adjusted under 35 U.S.C. 154(b) by 139 days.

(21) Appl. No.: 09/702,265

(22) Filed: Oct. 31, 2000

Related U.S. Application Data

(63) Continuation-in-part of application No. 09/516,594, filed on Aug. 10, 1998, now abandoned, which is a continuation-in-part of application No. 08/904,508, filed on Aug. 1, 1997, now abandoned.
(60) Provisional application No. 60/023,951, filed on Aug. 9, 1996.

(51) Int. Cl.$^7$ ................................................. A23L 1/20
(52) U.S. Cl. ...................................... 426/634; 426/656
(58) Field of Search ................................. 426/656, 634

(56) References Cited

U.S. PATENT DOCUMENTS

| | | | |
|---|---|---|---|
| 3,870,805 A | 3/1975 | Hayes et al. ................ 426/148 |
| 4,064,277 A | 12/1977 | Yokotsuka et al. ......... 426/331 |
| 4,157,984 A | 6/1979 | Zilliken ...................... 252/407 |
| 4,218,489 A | 8/1980 | Zilliken ...................... 426/545 |
| 4,259,358 A | 3/1981 | Duthie ......................... 426/46 |
| 4,428,876 A | 1/1984 | Iwamura .................. 260/123.5 |
| 5,320,949 A | 6/1994 | Shen .......................... 435/68.1 |
| 5,352,384 A | 10/1994 | Shen .......................... 252/398 |
| 5,424,331 A | 6/1995 | Shlyankevich ............. 514/456 |
| 5,506,211 A | 4/1996 | Barnes et al. .................. 514/27 |
| 5,516,528 A | 5/1996 | Hughes et al. .............. 424/464 |
| 5,554,519 A | 9/1996 | Weber et al. ................ 435/125 |
| 5,569,459 A | 10/1996 | Shlyankevich ........... 424/195.1 |
| 5,637,561 A | 6/1997 | Shen et al. ...................... 514/2 |
| 5,637,562 A | 6/1997 | Shen et al. ...................... 514/2 |
| 5,670,632 A | 9/1997 | Chaihorsky .................... 536/8 |
| 5,679,806 A | 10/1997 | Zheng et al. ............... 549/403 |
| 5,702,752 A | 12/1997 | Gugger et al. .............. 426/634 |
| 5,726,034 A | 3/1998 | Bryan et al. ............... 435/68.1 |
| 5,763,389 A | 6/1998 | Shen et al. ...................... 514/2 |
| 5,821,361 A | 10/1998 | Waggle et al. .............. 536/128 |
| 5,827,682 A | 10/1998 | Bryan et al. ............... 435/68.1 |
| 5,830,887 A | 11/1998 | Kelly ............................ 426/46 |
| 5,851,792 A | 12/1998 | Shen et al. ................. 435/68.1 |
| 5,919,921 A | 7/1999 | Waggle et al. .............. 536/128 |
| 5,990,291 A | 11/1999 | Waggle et al. .................. 536/8 |
| 5,994,508 A | 11/1999 | Bryan et al. ................ 530/378 |
| 6,013,771 A | 1/2000 | Shen et al. .................. 530/378 |
| 6,083,553 A | 7/2000 | Waggle et al. .............. 426/629 |

FOREIGN PATENT DOCUMENTS

| | | |
|---|---|---|
| EP | 647408 A1 | 4/1995 |
| EP | 834262 | 10/1997 |
| JP | 1-258669 | 10/1989 |
| JP | 04-266898 A | 9/1992 |
| JP | 5170756 A | 7/1993 |
| JP | 6287554 A | 10/1994 |
| JP | 07236439 A | 9/1995 |
| JP | 8214787 A | 8/1996 |
| JP | 82-83283 A | 10/1996 |
| JP | 90-23822 A | 1/1997 |
| SU | 1514765 | 10/1989 |
| WO | PCT WO 93/23069 | 11/1993 |
| WO | PCT WO 95/10530 | 4/1995 |
| WO | PCT WO 95/16362 A1 | 6/1995 |
| WO | PCT WO 97/07811 | 3/1997 |

OTHER PUBLICATIONS

Matsuura and Obata, "Beta–glucosidases From Soybeans Hydrolyze Daidzin and Genistin", *J Food Science*, vol. 58; No. 1; pp. 144–147; (1993).

Eldridge, A. C., Determination of Isoflavones in Soybean Flours, Protein Concentrates, and Isolates, *J. Agri Food Chem.*, vol. 30; No. 2; pp. 353–355; (1982).

Matsurra, Obata, Fukushima, Objectionable Flavor of Soy Milk Developed During the Soaking of Soybeans and its Control, *J. Food Science*, vol. 54; No. 3; pp. 602–605; (1989).

Wang and Murphy, "Isolfavone Content in Commercial Soybean Foods", *J. Agric. Food Chem.*, vol. 42; No. 8; pp. 1666–1673; (1994).

Babaskin, Barabanov, and Babaskina, "Chemical Constitution and Biological Activity of Plants of the Clover Genus Trifolium L.", *Farmatsiya Moscow*, vol. 38, No. 3; pp. 78–82; (1989).

Price and Fenwick, "Naturally Occuring Oestrogens in Foods—A Review", *Food Additives and Contaminants*, vol. 2, No. 2, pp. 73–106; (1985).

Murkies A. L., Lombard C., Strauss B. J. G., Wilcox, G, Burger H. G., "Dietary Flour Supplementation Decreases Post–Menopausal Hot Flushes", *Maturitas*, vol. 21(3), pp. 189–195; (1995).

Wilcox, Wahlqvist, and Griffiths, "Determination of Lignans and Isoflavanoids in Human Female Plasma Following Dietary Supplementation", *J. of Endocrinology*, vol. 142(2); pp. 251–259; (1994).

Verdeal and Ryan, "Naturally Occurring Estrogens in Plant Foodstuffs, A Review", *J. Food Protect*, vol. 42(7), pp. 577–583; (1979).

Franke, Custer, Cerna and Narala, "Quantitation of Phytoestrogens in Legumes by HPLC", *J. Agric. Food Chem.*, vol. 42; pp. 1905–1913; (1994).

(List continued on next page.)

Primary Examiner—Anthony J. Weier
(74) Attorney, Agent, or Firm—James L. Cordek; Richard B. Taylor

(57) ABSTRACT

A vegetable protein flour or grit is provided which is rich in aglucone isoflavones. In one embodiment, the vegetable protein flour or grit contains at least 400 parts per million of genistein and 400 ppm of daidzein. In another embodiment the vegetable protein flour or grit contains at least 50% genistein and daidzein relative to all genistein family isoflavones and daidzein family isoflavones, respectively.

6 Claims, No Drawings

OTHER PUBLICATIONS

Knight, Wall and Eden, "A Review of Phytoestrogens and Their Effects in Relation to Menopausal Symptoms", *Australian J. of Nut. and Dietetics*, 53:1; pp. 5–11; (1996).

Murphy, "Phytoestrogen Content of Processed Soybean Products", *Food Technology*, pp. 60, 62–64; (Jan. 1982).

Murphy and Wang, "Total Genistein and Daidzein Content of Soyfoods", *Food Composition*, Abstract 4283.

Thuylinh Nguyenle, Euphemia Wag, and Andrew P. Cheung, "An Investigation on the Extraction and Concentration of Isoflavones in Soy–Based Products", *J. Pharm. Biomed. Anal.*, 14:221–232; (1995).

Barnes, Kirk and Coward, "Isoflavones and Their Conjugates in Soy Foods: Extraction Conditions and Analysis by HPLC—Mass Spectrometry", *J. Agric. Food Chem.*, 42:2466–2474; (1994).

Walz, "Isoflavone and Saponin Glucosides In Soya Hispida", *Justus Liebigs Ann. Chem.*, vol. 489; pp. 118–115; (1931).

AGLUCONE ISOFLAVONE ENRICHED VEGETABLE FLOUR AND GRIT

This application is a continuation-in-part of application Ser. No. 09/516,594 filed on Aug. 10, 1998, now abandoned, which is a continuation-in-part application of application Ser. No. 08/904,508 filed Aug. 1, 1997, now abandoned, which was an original application claiming priority from Provisional Application No. 60/023,951, filed Aug. 9, 1996.

FIELD OF THE INVENTION

The present invention relates to an aglucone isoflavone enriched vegetable flour and an aglucone isoflavone enriched vegetable grit, and methods for providing such by converting isoflavone glucosides in a vegetable material to aglucone isoflavones and processing the vegetable material into a vegetable flour or grit.

BACKGROUND OF THE INVENTION

Isoflavones occur in a variety of leguminous plants, including vegetable protein materials such as soybeans. These compounds include daidzin, 6"-OAc daidzin 6"-OMal daidzin, daidzein, genistin, 6"-OAc genistin, 6"-OMal genistin, genistein, glycitin, 6"-OAc-glycitin, 6"-OMal glycitin, glycitein, biochanin A, formononentin, and coumestrol. Typically these compounds are associated with the inherent, bitter flavor of soybeans.

The isoflavones in vegetable protein materials include isoflavone glucosides (glucones) and aglucone isoflavones. Isoflavone glucosides have a glucose molecule attached to an isoflavone moiety. Additional moieties may be attached to the glucose molecule of an isoflavone glucoside, for example, 6"-OAc genistin contains an acetate group attached to the six position of the glucose molecule of genistin. Aglucone isoflavones consist solely of an isoflavone moiety.

Soy contains three "families" of isoflavone compounds having corresponding glucoside and aglucone members: the genistein family, the daidzein family, and the glycitein family. The genistein family includes the glucoside genistin, the conjugates 6"-OMal genistin (6"-malonate ester of genistin) and 6"-OAc genistin (6"-acetate ester of genistin); and the aglucone genistein. The daidzein family includes the glucoside daidzin, the conjugates 6"-OMal daidzin, and 6"-OAc daidzin; and the aglucone daidzein. The glycitein family includes the glucoside glycitin, the conjugate 6"-OMal glycitin, and the aglucone glycitein.

In the production of commercial products the focus has been to remove these materials. For example, in a conventional process for the production of a soy protein isolate or concentrate isoflavones in the protein are usually removed by exhaustive washing. The washes are typically discarded.

It has recently been recognized that the isoflavones contained in vegetable materials such as soybeans, clover, alfalfa, peanuts, and nearly all types of legumes have medicinal value. While all the isoflavones are of interest in medical evaluation, the aglucones are the specific isoflavones of most interest. Geinstein and daidzein may significantly reduce cardiovascular risk factors. "Plant and Mammalian Estrogen Effects on Plasma Lipids of Female Monkeys", Circulation, vol. 90, p. 1259 (October 1994). Genistein and daidzein are also thought to reduce the symptoms of conditions caused by reduced or altered levels of endogenous estrogen in women, such as menopause or premenstrual syndrome, as disclosed in U.S. Pat. No 5,498,631. It has recently been recognized that aglucone isoflavones may inhibit the growth of human cancer cells, such as breast cancer cells and prostate cancer cells, as described in the following articles: "Genistein Inhibition of the Growth of Human Breast Cancer Cells, Independence from Estrogen Receptors and the Multi-Drug Resistance Gene" by Peterson and Barnes, Biochemical and Biophysical Research, Communications, Vol. 179, No. 1, pp. 661–667, Aug. 30, 1991; "Genistein and Biochanin A Inhibit the Growth of Human Prostrate Cancer Cells but not Epidermal Growth Factor Receptor Tyrosine Autophosphorylation" by Peterson and Barnes, The Prostate, Vol. 22, pp. 335–345 (1993); and "Soybeans Inhibit Manunary Tumors in Models of Breast Cancer" by Barnes, et al., Mutagens and Carcinogens in the Diet, pp. 239–253 (1990).

As noted above, the aglucone isoflavones include daidzein, genistein, and glycitein. These aglucones have the following general formula:

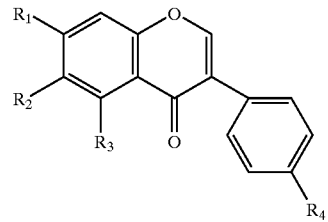

wherein, $R_1$, $R_2$, $R_3$, $R_4$ may be selected from the group consisting of H, OH and $OCH_3$. Genistein has the formula above where $R_1$=OH, $R_2$=H, $R_3$=OH, and $R_4$=OH, daidzein has the formula above where $R_1$=OH, $R_2$=H, $R_3$=H, and $R_4$=OH, and glycitein has the formula above where $R_1$=OH, $R_2$=$OCH_3$, $R_3$=H, and $R_4$=OH.

It is therefore to the aglucones and enrichment of a vegetable flour and a vegetable grit with these compounds to which the present invention is directed. The present invention is also directed to methods of making an aglucone enriched vegetable flour and an aglucone isoflavone enriched vegetable grit from a vegetable material containing isoflavone glucosides.

Processes are known in the art for converting isoflavone glucosides to aglucone isoflavones, such as described in Japanese Patent Application 258,669 to Obata, et al. These processes achieve only a moderate extent of conversion of the glucosides to aglucones, and require a substantial period of time to effect this moderate extent conversion. In addition, known processes such as described in the '669 application are directed to removing the isoflavones from vegetable materials, and do not provide aglucone isoflavone enriched vegetable flour or grit products.

A process is also known for producing an aglucone isoflavone enriched vegetable protein fiber from a vegetable protein material, as described in U.S. Pat. No. 5,320,949 to Shen. The process is a process in which isoflavone glucosides in a vegetable fiber material are converted to aglucone isoflavones with a beta glucosidase enzyme.

An aglucone isoflavone enriched vegetable flour or grit and processes for producing the same are desirable, since production of commercial vegetable flours and grits is relatively inexpensive. An aglucone isoflavone enriched vegetable flour or grit, therefore, would be an inexpensive source of aglucone isoflavone enriched products.

It is therefore an object of the present invention to provide an aglucone isoflavone enriched vegetable flour and a process for producing the same from a vegetable material containing isoflavone glucosides.

It is further object of the present invention to provide an aglucone isoflavone enriched vegetable grit, and a process for producing the same from a vegetable material containing isoflavone glucosides.

SUMMARY OF THE INVENTION

In one aspect, the present invention is a process for producing an aglucone isoflavone enriched vegetable flour or grit from a vegetable material containing isoflavone glucosides. An aqueous slurry is formed of the vegetable material. An enzyme is contacted with the isoflavone glucosides in the slurry at a temperature and a pH for a time period sufficient to convert the isoflavone glucosides to aglucone isoflavones. The vegetable material is then comminuted to form an aglucone isoflavone enriched vegetable flour or grit.

In one embodiment, the enzyme is contacted with the isoflavone glucosides in the slurry at a temperature of about 5° C. to about 75° C. and a pH of about 3 to about 9. Preferably the enzyme is contacted with the isoflavone glucosides in the slurry for a period of about 1 to about 24 hours, most preferably for about 1 to about 3 hours, to convert at least a majority of the isoflavone glucosides to aglucone isoflavones.

In another embodiment of the invention, the enzyme is a supplemental enzyme which is added to the slurry in an amount effective to convert the isoflavone glucosides to aglucone isoflavones. Preferably, the supplemental enzyme is a saccharidase enzyme capable of cleaving 1,4-glucoside bonds. Most preferably, the supplemental enzyme converts substantially all of the isoflavone glucosides to aglucone isoflavones in about 1 hour to about 3 hours.

In a further aspect, the invention is a process for producing an aglucone isoflavone enriched vegetable flour or grit from a vegetable material containing isoflavone glucosides, where the vegetable material is initially comminuted to form a vegetable flour or grit. An aqueous slurry is formed of the vegetable flour or grit, and an enzyme is contacted with the isoflavone glucosides in the slurry at a temperature and a pH for a time period sufficient to convert the isoflavone glucosides to aglucone isoflavones. Preferably the enzyme is a supplemental enzyme contacted with the isoflavone glucosides in the slurry at about 5° C. to about 75° C. and at a pH of about 3 to about 9 for about 1 hour to about 24 hours. Most preferably the supplemental enzyme is a saccharidase enzyme capable of cleaving 1,4-glucoside bonds which is contacted with the isoflavone glucosides for a period of about 1 to 3 hours to convert substantially all of the isoflavone glucosides to aglucone isoflavones.

In still another aspect, the invention is a process for producing an aglucone isoflavone enriched soy flour or grit. A soy material containing isoflavone glucosides is provided from a group comprising soy cake, soy meal, soy chips, soy flakes, or combinations thereof. The isoflavone glucosides of the soy material are contacted with an enzyme at a temperature and a pH for a time period sufficient to convert the isoflavone glucosides to aglucone isoflavones. The soy material is comminuted to form an aglucone isoflavone enriched soy flour or grit.

DESCRIPTION OF THE PREFERRED EMBODIMENTS

The starting material of the process for producing the aglucone isoflavone enriched vegetable flour or grit of the present invention is any vegetable material or plant material containing isoflavone glucosides. The preferred starting material is a soybean material, however, a wide array of vegetable and plant materials may be used, including clover, alfalfa, peanuts, and nearly all types of legumes.

The vegetable or plant starting material is preferably processed into a finely divided form to render the isoflavone glucosides in the material more accessible to the various reagents and enzymes as described below. If the vegetable or plant starting material is in a state such that the isoflavone compounds in the, plant material are readily accessible to external reagents or reactants, such as vegetable materials having small leafy portions, it may not be necessary to subject the plant material to such processing. The vegetable or plant starting material may be processed into a finely divided form by comminuting the material according to conventional methods for comminuting vegetable or plant materials such as grinding, shearing, or crushing.

Preferably the vegetable or plant starting material is comminuted into a flour or a grit. "Flour" products, as that term is used herein, refers to a comminuted form of a defatted vegetable or plant material formed of particles having a size such that the particles can pass through a No. 100 mesh (U.S. Standard) screen and which contains vegetable protein and vegetable fiber. "Grit" products, as used herein, refers to a comminuted form of a defatted vegetable or plant material formed of particles having a size such that the particles can pass through No. 10 to No. 20 screens (coarse grit), No. 20 to No. 40 screens (medium grit), or No. 40 to No. 80 screens (fine grit) with which contains vegetable protein and vegetable fiber. A vegetable flour or a vegetable grit is defined herein as containing from 40% to 60% protein, by dry weight; from 2% to 4% fiber, by dry weight; and from 30% to 35% carbohydrates, by dry weight.

If the vegetable material to be used as a starting material is a soybean material, the material may be soybeans or a soybean derivative. Preferably the soybean starting material is either soybean cake, soybean chips, soybean meal, soybean flakes, or a mixture of these materials. The soybean cake, chips, meal, or flakes may be formed from soybeans according to conventional procedures in the art, where soybean cake and soybean chips are formed by extraction of part of the oil in soybeans by pressure or solvents, soybean flakes are formed by cracking, heating, and flaking soybeans and reducing the oil content of the soybeans by solvent extraction, and soybean meal is formed by grinding soybean cake, chips, or flakes. The soy cake, chips, flakes, meal, or mixture of the materials may be comminuted into a soy flour or a soy grit, as described above, to render the isoflavone glucosides in the soy material more accessible to the reagents and reactants described below.

An aqueous slurry is formed of the vegetable or plant starting material by mixing the material with a sufficient amount of water. The amount of water is not critical, so long as a relatively uniform mixture or dispersion is formed and the slurry is not so viscous that mixing or agitation of the slurry is inhibited. Preferably the slurry is formed so that the vegetable or plant material is present in a concentration of about 10% to about 30% by weight, and most preferably, about. 15% to about 20% by weight.

The isoflavone glucosides in the vegetable or plant material are converted to aglucone isoflavones by contacting the isoflavone glucosides with an enzyme in the slurry. The conversion produces an aglucone isoflavone enriched vegetable or plant material by converting at least a majority, and preferably substantially all of the isoflavone glucosides to aglucone isoflavones.

The conversion has been found to be dependent on the concentration of enzymes present in the slurry, and their characteristics. The enzymes required to effect the conversion are enzymes capable of cleaving the glucosidic linkage between the isoflavone moiety and the glucose molecule of the isoflavone glucosides. In a preferred embodiment, the enzymes are saccharidase or gluco-amylase enzymes capable of cleaving 1,4-glucoside bonds.

The concentration of enzymes required to convert the isoflavone glucosides to aglucone isoflavones is dependent on a variety of factors including the types of enzymes present in the slurry, distribution of enzyme concentrations, activities of the enzymes, and the pH and temperature of the slurry during the conversion. The enzymes may be inherently present in the slurry either from the vegetable or plant material or from microbial growth in the slurry. Such inherently present enzymes are referred to herein as "residual" enzymes, and enzymes that are added to the slurry are referred to wherein as "supplemental" enzymes.

Sufficient enzyme should be present in the slurry to convert at least a majority, and preferably substantially all, of the isoflavone glucosides to aglucone isoflavones. Generally, if the residual enzymes in the slurry are insufficient to effect the conversion, supplemental enzymes should be added to the slurry. In a preferred embodiment, supplemental enzymes are added to the slurry regardless whether sufficient residual enzymes are present in the slurry since addiction of supplemental enzymes dramatically decreases the time necessary to effect the conversion of the isoflavone glucosides to aglucone isoflavones. If supplemental enzymes are added, the supplemental enzymes should be added so that the total concentration of enzyme present is about 0.1% to about 10% by weight of the vegetable or plant material on a dry basis.

Supplemental enzymes are selected based on optimum activity at selected pH and temperature conditions, and cost effectiveness. The supplemental enzymes are enzymes capable of cleaving the bond between the isoflavone moiety and the glucose molecule of the isoflavone glucosides, such as saccharidase and gluco-amylase enzymes capable of cleaving 1,4-glucoside bonds. Preferred supplemental enzymes are commercially available alpha-and beta-glucosidase enzymes, beta-galactosidase enzymes, gluco-amylase enzymes, and pectinase enzymes. Particularly preferred are enzymes such as Biopectinase 100L (which is preferably utilized at a pH range of from about 3 to about 6), Biopectinase 300L (optimum pH range from about 3 to about 6), Biopectinase OK 70L (optimum pH range from about 3 to about 6), Biolactase 30,000 (optimum pH range from about 3 to about 6) Neutral Lactase optimum pH range from about 6 to about 8), all of which are available from Quest International, 1833 57th Street, Post Office Box 3917, Sarasota, Fla. 34243. Also especially preferred are Lactase F (which is preferably utilized at a pH range of from about 4 to about 6), and Lactase 50,000 (optimum pH range from about 4 to about 6), both available from Amano International Enzyme Co., Inc., Post Office Box 1000, Troy, Virginia 22974. Other particularly preferred supplemental enzymes include G-Zyme G990 (optimum pH from about 4 to about 6) and Enzeco Fungal Lactase Concentrate (optimum pH from about 4 to about 6):available from Enzyme Development Corporation, 2 Penn Plaza, Suite 2439, New York, N.Y. 10121; Lactozyme 3000L (which preferably is utilized at a pH range from about 6 to about 8), and Alpha-Gal 600L (which preferably is utilized at a pH range of from about 4 to about 6.5), available from Novo Nordisk Bioindustrials, Inc., 33 Turner Road, Danbury, Conn. 06813; Maxilact L2000 (which is preferably utilized at a pH range of from about 4 to about 6), available from Gist Brocades Food Ingredients, Inc., King of Prussia, Pa., 19406; and Neutral Lactase (which is preferably utilized at a pH range of from about 6 to about 8), available from Pfizer Food Science Group, 205 East 42nd Street, New York, N.Y. 10017.

The pH range for enzymatic conversion of the isoflavone glucosides to aglucone isoflavones is from about 3 to about 9. The pH that is utilized depends primarily upon the type of enzyme used, and should be selected accordingly. The residual enzyme is active within a pH range of about 7 to about 9, although it is believed that the pH of the extract is lowered during the course, of the conversion. The supplemental enzymes are active within an optimum pH range specified by the manufacturer of the enzyme, as shown above for several specific enzymes. Typically the supplemental enzymes are active either in a neutral pH range from about 6 to about 8, or in an acidic pH range from about 3 to about 6.

The pH of the slurry may be adjusted to a desired value for conducting the isoflavone conversion. The pH may be reduced or increased using conventional acidic and basic reagents, respectively, such as hydrochloric acid, acetic acid, sulfuric acid, sodium hydroxide, and potassium hydroxide.

The temperature range for the isoflavone glucoside conversion is from about 5° C. to about 75° C. The temperature significantly affects the activity of the enzymes, and therefore, the rate of conversion. The supplemental enzymes may be active above 70° C., for example Alpha-Gal 600L is active at 75° C., however, it is preferred to conduct the conversion at lower temperatures to avoid enzyme deactivation. In preferred embodiment, the conversion is effected between about 35° C. and about 45° C.

The time required for the isoflavone glucoside conversion step depends upon enzyme-related factors, particularly concentration and the temperature and pH of the system. In most instances it is possible to achieve substantially complete conversion within 24 hours, however, it is preferred that supplemental enzyme be added to dramatically decrease the time required for the conversion. The selected supplemental enzyme, enzyme concentration, pH and temperature preferably cause substantially complete conversion within 3 hours, and most preferably within 1 hour.

The very high degrees of conversion with this process are such that at least a majority, and preferably substantially all, the isoflavone glucosides present in the slurry are converted to aglucone form. The term "a majority" refers to an extent of conversion of isoflavone glucosides to aglucone isoflavones of at least about 50%. The term "substantially all" refers to an extent of conversion of isoflavone glucosides to aglucone isoflavones of at least about 80%, and most preferably at least about 90%.

Upon completion of the conversion of isoflavone glucosides to aglucone isoflavones, the aglucone enriched vegetable or plant material may be comminuted to produce an aglucone enriched vegetable or plant flour or grit if the material was not comminuted before formation of the slurry, or if the material had not been sufficiently comminuted to form a flour or a grit. Preferably the aglucone isoflavone enriched vegetable or plant material is separated from the slurry and dried prior to being comminuted. If the vegetable or plant material had been sufficiently comminuted to form a flour or a grit prior to the conversion, the material is separated from the slurry and dried.

The aglucone isoflavone rich vegetable flour or grit of the invention contains substantially increased amounts of aglucone isoflavones relative to conventional vegetable flours or grits. Conventional commodity vegetable flours and grits typically contain from 5 to 75 parts per million ("ppm") genistein (2–17% genistein relative to all genistein family isoflavones by weight normalized to only the genistein component of the genistein family isoflavones, where "genistein family isoflavones" is herein specifically defined as genistein, genistin, 6"-O-Mal genistin, and 6"-O-Ac genistin); and from 2 to 125 ppm daidzein (2–15% daidzein relative to all daidzein family isoflavones by weight normalized to only the daidzein component of the daidzein familiy isoflavones, where "daidzein family isoflavones" is herein specifically defined as daidzein, daidzin, 6"-O-Mal daidzin, and 6"-O-Ac daidzin). Specialty flours and grits, such as flours and grits derived from high sucrose soybeans, may contain up to 200 ppm of genistein and 225 ppm of daidzein. The vegetable flours and grits of the present invention, however, contain at least 400 ppm of genistein and 400 ppm of daidzein; more preferably at least 500 ppm genistein and 500 ppm of daidzein; and most preferably at least 700 ppm of genistein and 700 ppm of daidzein. The vegetable flours and grits of the present invention also contain at least 50% genistein relative to all genistein family isoflavones by weight normalized to only the genistein component of the isoflavones; and at least 50% daidzein relative to all daidzein family isoflavones by weight normalized to only the daidzein component of the isoflavones, and more preferably contain at least 80% genistein relative to all genistein family isoflavones and at least 80% daidzein relative to all daidzein family isoflavones, and most preferably at least 90% genistein relative to all genistein family isoflavones and at least 90% daidzein relative to all daidzein family isoflavones.

The aglucone isoflavone enriched vegetable or plant flour or grit provides the functional, structural, and nutritional benefits of the protein and fiber components of the flour or grit, and may be employed in a variety of products for supplying the health benefits of the aglucone isoflavones. For example, the aglucone isoflavone enriched vegetable plant flour and grit material may be used in breads, rolls, cakes, cake mixes, biscuits, cookies, crackers, pancakes, sweet pastries, snacks, donuts, pasta, breakfast cereals, milk replacers, infant formulas, coarsely ground meat products, piza toppings, and a wide array of miscellaneous applications including use in candies, confections, desserts, dietary items, and pet foods.

The present invention is illustrated in more detail by the following examples using a soybean material as the vegetable material containing isoflavone glucosides. The soybean material is in the form of finely ground soybean flakes (soy flour) which have been extracted with a solvent to remove oil from the flakes.

As noted above, soy materials include the genistein, daidzein, and glycitein "families" of isoflavones having corresponding glucoside, conjugate, and aglucone members, where the genistein family contains the conjugates 6"-OMal genistin, and 6"-OAc genistin, the glucoside genistin, and the aglucone genistein; the daidzein family contains the conjugates 6"-OMal daidzin, 6"-OAc daidzin, the glucoside daidzin, and the aglucone daidzein; and the glycitein family contains the conjugate 6"-OMal glycitin, the glucoside glycitin, and the aglucone glycitein.

In the following examples the relative concentrations of the isoflavones are measured as a percentage of a family of isoflavones. For example, in the genistein family: % genistin+% 6"-OMal genistin+% 6"-OAc genistin+% genistein=100%. The extent of conversion of glucosides to aglucones can be determined by comparing the relative percentages of the glucoside to the aglucone compounds in a respective isoflavone family.

What is claimed is:

1. A composition comprising a vegetable protein flour or grit containing from 40% to 60% protein, by dry weight, and at least 400 parts per million genistein.

2. The composition of claim 1 containing at least 400 parts per million daidzein.

3. A composition comprising a vegetable protein flour or grit containing from 40% to 60% protein, by dry weight, and at least 400 parts per million daidzein.

4. A composition comprising a vegetable protein flour or grit containing from 40% to 60% protein, by dry weight, wherein genistein comprises at least 50% genistein relative to all genistein family isoflavones by weight normalized to only the genistein component of the genistein family of isoflavones.

5. The composition of claim 4 wherein daidzein comprises at least 50% daidzein relative to all daidzein family isoflavones by weight normalized to only the daidzein component of the daidzein family of isoflavones.

6. A composition comprising a vegetable protein flour or grit containing from 40% to 60% protein, by dry weight, wherein daidzein comprises at least 50% daidzein relative to all daidzein family isoflavones by weight normalized to only the daidzein component of the daidzein family of isoflavones.

* * * * *